Dec. 26, 1933.        L. A. MAYLE        1,941,016
DIE CLEARING MECHANISM
Filed Dec. 31, 1930        2 Sheets-Sheet 1
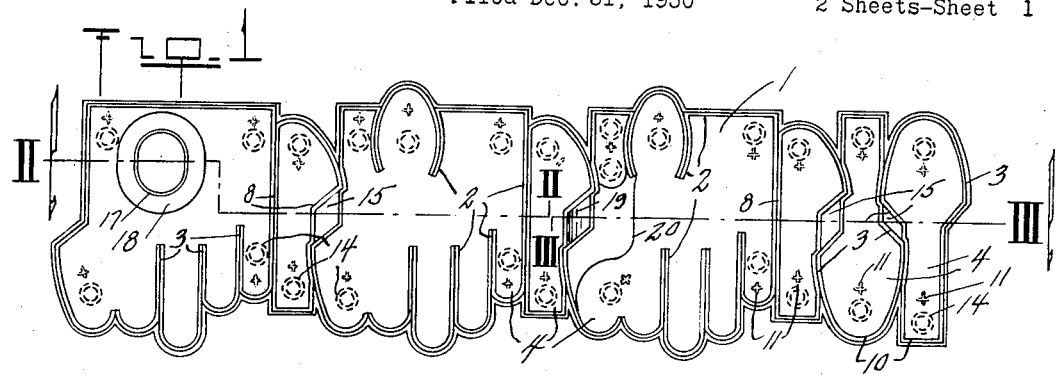
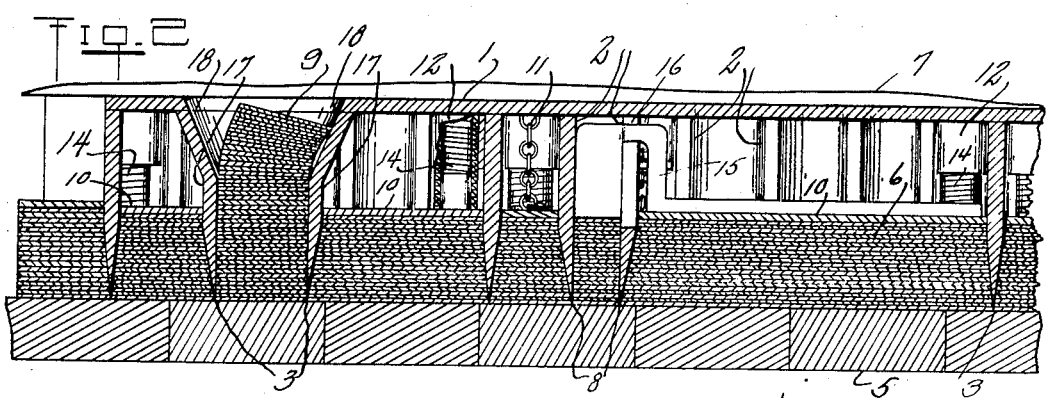
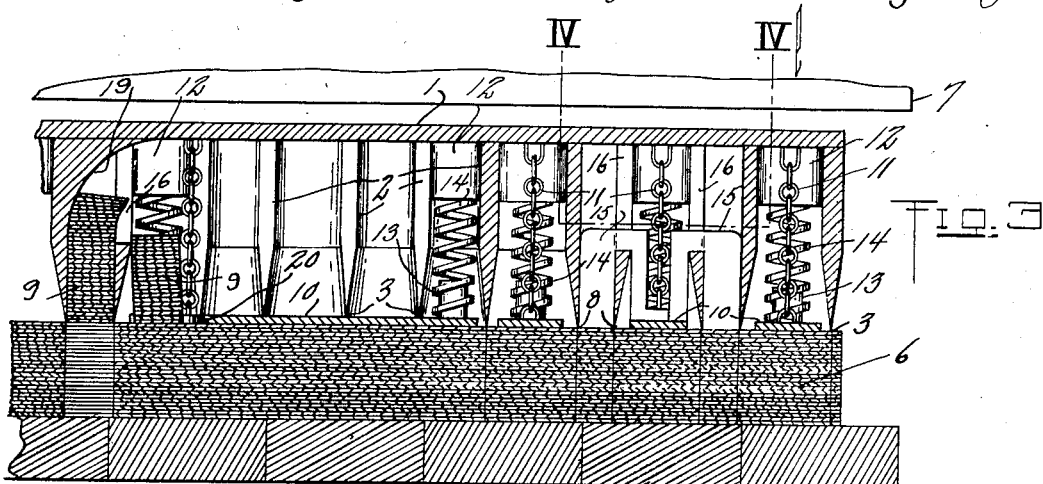
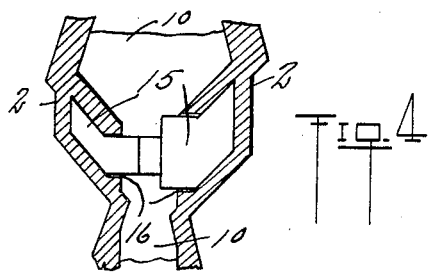
Inventor
Louis A. Mayle
By Geo E Kirk
Attorney Dec. 26, 1933.  L. A. MAYLE  1,941,016
DIE CLEARING MECHANISM
Filed Dec. 31, 1930  2 Sheets-Sheet 2
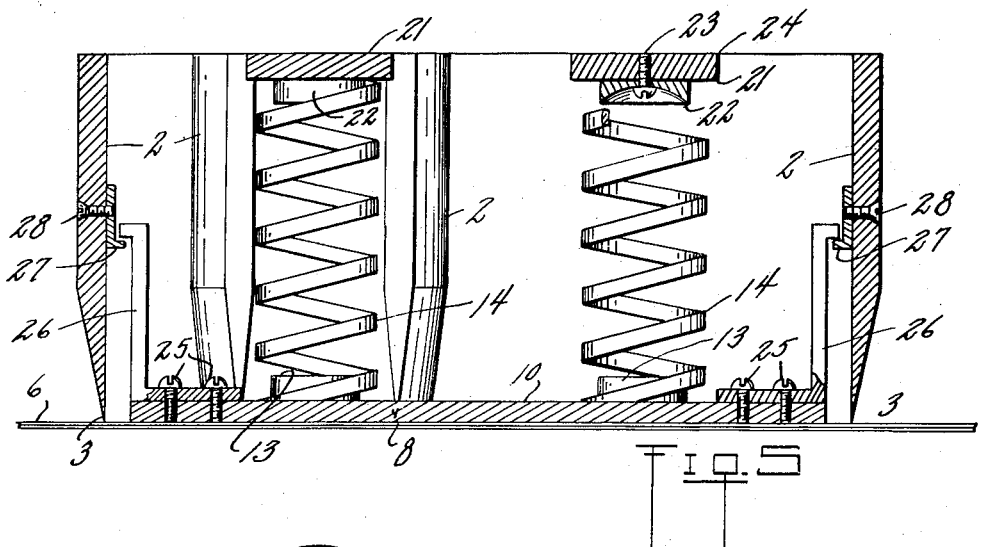
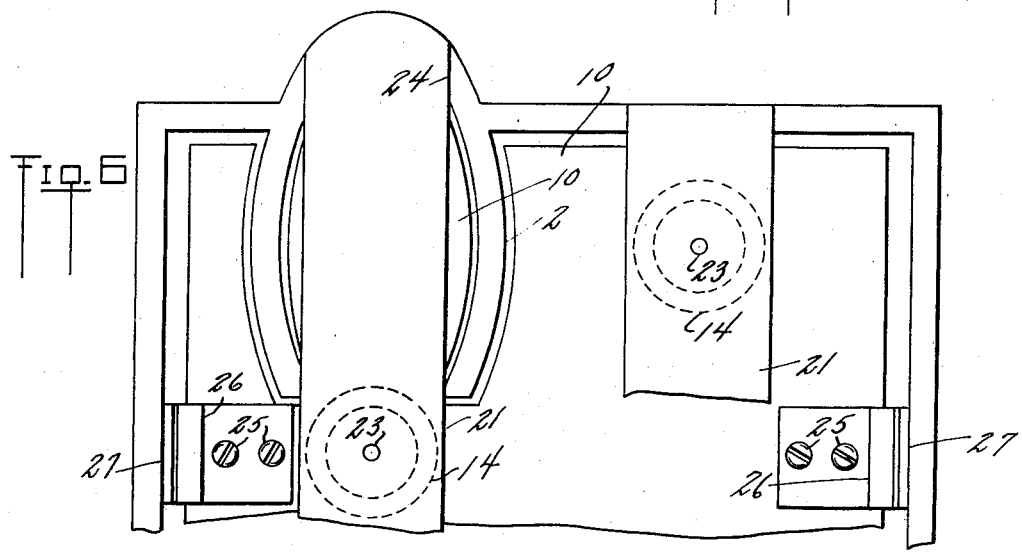
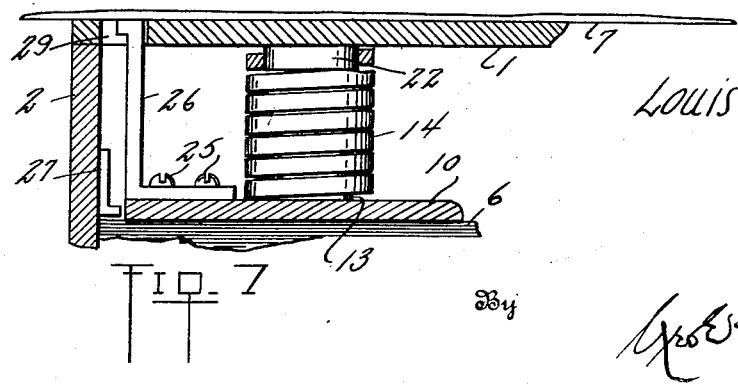
Louis A Mayle
Inventor
By Patented Dec. 26, 1933

1,941,016

UNITED STATES PATENT OFFICE 1,941,016

DIE-CLEARING MECHANISM

Louis A. Mayle, Fremont, Ohio

Application December 31, 1930. Serial No. 505,690

6 Claims. (Cl. 164—33)

This invention relates to die clearing mechanism.

This invention has utility when incorporated in fabric cutting dies for ejecting cut material therefrom.

Referring to the drawings:—

Fig. 1 is a bottom plan view of a die embodying the invention herein;

Fig. 2 is a view on the line II—II, Fig. 1, showing the parts in cut completing position;

Fig. 3 is a view on the line III—III, Fig. 1, showing the parts in position lifted from a cut;

Fig. 4 is a view on the line IV—IV, Fig. 3;

Fig. 5 is a view similar to Fig. 3, showing a die with a modified ejector construction;

Fig. 6 is a plan view showing the ejector mechanism of Fig. 5; and

Fig. 7 is a fragmentary view of the die embodying the ejector mechanism of Fig. 5, showing the parts in cut completing position.

The die of the invention herein comprises head 1 mounted upon wall 2 depending therefrom to terminate in cutting edge 3. The wall 2 is configured to outline a plurality of interfitting patterns 4 being the several elements of a fabric glove.

The die is used to cut several thicknesses of fabric at once, being a step in the manufacture of gloves, more particularly the canvas work glove.

The cutting edge 3 is forced toward cutter board 5 through a pile of fabric sheets 6 supported thereon. Pressure may be placed against the head 1 by press 7. The cutting edge 3 as forced through the pile of fabric has several instances of a common cutting edge 8 between adjacent patterns forming glove elements and also small waste pieces 9. The arrangement is so developed that these pieces 9 are reduced to a minimum area tending toward conservation of the stock.

Opposing the head 1 are plates 10 within the majority of the patterns 4 and contoured to approximate the pattern outlines. Chains 11 extend between the head 1 and the plates 10 to delimit the extreme spacing therebetween. Depending from the head 1 within the patterns 4 are cylinders or sockets 12 opposed by stems 13 carried by the plates 10. Springs 14 about the stems 13 extend upwardly into the sockets 12 thereby maintaining a pressure against the plates for normal extreme spacing therebetween.

In a cutting operation, the die is placed upon a pile of fabric sheets and the cutting edge forced therethrough. The endless walls 2 as outlining the various patterns have a tendency to retain the cut elements as the die is lifted from the cut. However, during the cutting, the plates 10 are telescoped into the die against the springs 14 while maintaining a compacting pressure on the fabric pile, and as the die is lifted after the cut, the springs exert sufficient pressure to clear the cut pieces from the various patterns. The springs act directly against the plates within the patterns equipped with these ejector mechanisms. The chains 11 permit the plate outer surfaces to move to the plane of the cutting edge thereby effectively clearing all the fabric pieces from the die.

In instances wherein the patterns outline unusually small elements or the waste pieces 9, the areas of the patterns are too small to house a complete ejecting mechanism. In some of these instances there are provided arch shaped extensions 15 from the plates 10 through openings 16 in the wall 8 between patterns, these extensions serving as ejectors for these smaller areas. In this manner, effective clearing of all the die may be had.

In the instance wherein a thumb opening is desired to be formed in an element, the wall between the cutting edge and the head 1 may have fractional portion 17 extend vertically from the cutting edge and then have portion 18 extend outwardly toward the head to form a funnel shaped opening through the die.

The upper enlarged portion surrounds a larger area than the cutting edge and allows accumulation of a previous cut to collect in this pocket without crowding. As the press is lifted from the die, this accumulation is easily scooped from the pocket.

Attainment of this self-cleaning pattern may be provided by inclined portion 19 from the wall 2 extending toward an opening 16 so that the previous cut accumulation is guided therethrough and drops through cut-out portion 20 of the plate 10 adjacent the opening.

The pieces 9 drop through the plate 10 onto the fabric pile and as the die is lifted following the cut, these pieces may be brushed away.

When two or more small patterns are cut adjacent a larger pattern, the plate 10 therein may have a plurality of extensions 15 extending into each of these minor areas.

There is thus provided a die capable of self-clearing simultaneously and effectively all the elements formed by a cut as well as any trimming or small waste pieces.

In some instances it may be desired to construct the die as shown in Figs. 5, 6, 7, wherein the chains 11 are omitted. Bars 21 may be mounted across the die top as a head against which the springs 14 coact. Cup-shaped stems 22 depend from the bars 21 and are held in place by screws 23. These cup-shaped depending stems oppose the stems 13 and coact therewith to position the springs 14.

The walls 2 at the top are provided with seats 24 so that the upper faces of the bars 21 will be flush with the upper or top edge of the walls 2. There is thus provided a skeleton structure of sufficient strength to withstand the cutting pressure and yet being of light construction permitting easy manual shifting. The cupped stems also tend to lessen the weight.

Attached to the plate 10 by screws 25 are upwardly extending hook extensions 26, which when the plate 10 is in its down or lower-most position, the springs 14 extended, these hook extensions abut stops 27 carried by the walls 2 as mounted thereon by means of screws 28. These extensions 26 and stops 27 may be distributed to maintain the plate on a horizontal plane within the die structure. If it is desired to use the head 1 for additional strength such may be provided with cut-out regions 29 through which the extensions 26 may extend when the die is in cut completing position allowing ample room for these extensions to extend upward against the press 7.

In the cutting of stock, especially the cut adjacent the selvage, there is sometimes a tendency for this edge to work up between the plate 10 and the walls 2, or in certain kinds of stock, lint or ravelings will also tend to get into the region housing the springs. This open-top construction permits ready inspection and removal of any undesirable accumulations.

What is claimed and it is desired to secure by United States Letters Patent is:

1. A cutting die having a wall terminating in a cutting edge forming interfitting patterns, said wall having an opening therethrough between the patterns spaced from the cutting edge, an ejector plate in one of the patterns, collapsible means to act upon the ejector plate and normally extending toward the cutting edge past said opening between the patterns, and inverted U-shaped means from said ejector plate having the cross-over portion of the U through said opening between the patterns, said U-shaped means thereby being effective as an ejector for the adjacent pattern as acted upon by said collapsible means in a range toward the cutting edge from said opening between the patterns.

2. A cutting die comprising a wall terminating in a cutting edge forming interfitting patterns, a head mounted upon said wall, said head having an opening therethrough, an ejector plate in one of the patterns, helical spring collapsible means to act upon the ejector plate and normally extending toward the cutting edge from said head having the opening, bracket means extending from said ejector plate to be shiftable into said opening at the retracted position of the collapsible means, and a stop fixed with the wall, spaced from the opening and to be engaged by the bracket to limit ejector outward movement as urged by the collapsible means in distended position of the collapsible means.

3. A cutting die having walls terminating in cutting edges forming interfitting patterns, one of said walls having an opening between adjacent patterns, the opposite wall of one pattern inclined from its cutting edge toward the opening, and an ejector plate within the other pattern having a cut-out portion adjacent the opening.

4. A cutting die member having walls terminating in cutting edges forming interfitting patterns, a head member mounted upon said die member, an ejector plate in one of the patterns, one of said members having an opening away from the cutting edges, a compression helical spring within the pattern forming extent of the die member and connected between the plate and head member, said ejector plate having fixed therewith an upstanding ledge, said die member having fixed therewith a stop with which the ledge may coact in limiting plate member travel away from the head member.

5. A cutting die having walls terminating in cutting edges forming interfitting patterns, a head member mounted upon said die, an ejector plate member in one of the patterns, said die having an opening away from the cutting edges into an adjacent pattern, and a compression helical spring within the pattern-forming extent of the die and connected between the plate member and head member, there being means rising from one member and projecting toward the other member, said means being housed by the die and cooperating to limit the extreme of telescoping movement of the plate member from the die.

6. A cutting die having walls terminating in cutting edges forming interfitting patterns, one of said walls having an opening between adjacent patterns, the opposite wall of one pattern inclined from its cutting edge toward the opening, an ejector plate within the other pattern having a cut-out portion adjacent the opening, and a helical spring within the pattern forming extent of said die for actuating said plate, there being means housed by the die and cooperating to limit the extreme of telescoping movement of the plate from the die.

LOUIS A. MAYLE.